Feb. 9, 1932.                    G. GLASER                    1,844,278
                                FLORAL FRAME
                             Filed Dec. 3, 1930              2 Sheets-Sheet 1
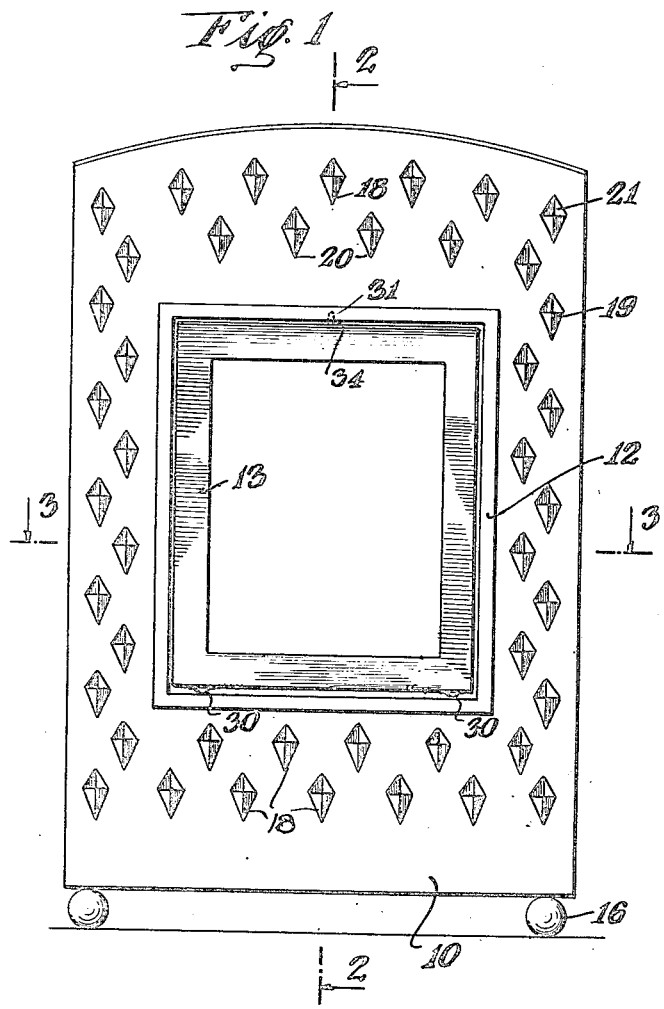
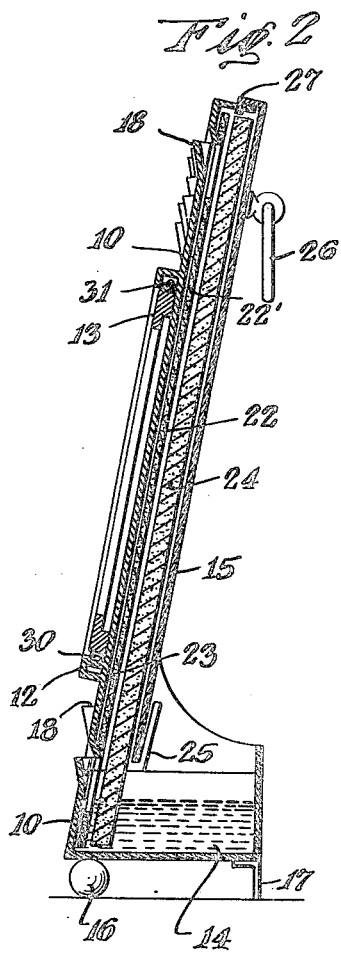
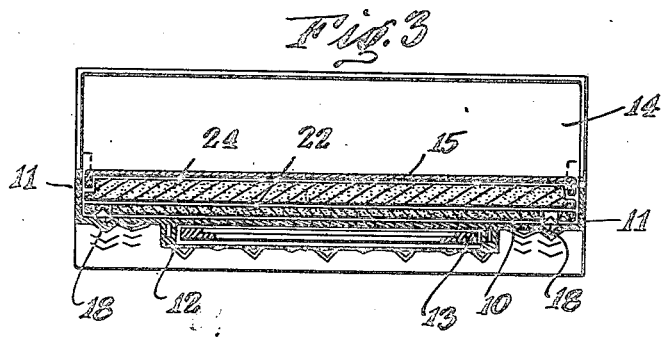
Gustav Glaser
INVENTOR
BY ATTORNEY Feb. 9, 1932.  G. GLASER  1,844,278
FLORAL FRAME
Filed Dec. 3, 1930  2 Sheets-Sheet 2

Gustav Glaser
INVENTOR
BY ATTORNEY
George C. Heinicke

Patented Feb. 9, 1932

1,844,278

UNITED STATES PATENT OFFICE

GUSTAV GLASER, OF BORK-ON-THE-LIPPE, GERMANY, ASSIGNOR OF THIRTY-THREE AND ONE-THIRD PER CENT TO OTTO STEINER, OF FLUSHING, LONG ISLAND, NEW YORK

FLORAL FRAME

Application filed December 3, 1930, Serial No. 499,756, and in Germany April 7, 1930.

My invention relates to improvements in picture frames, particularly to a floral frame and it is the principal object of my invention to provide a picture frame allowing the decoration of the picture with live flowers and provided with means to keep the flowers fresh for a considerable time.

Another object of my invention is the provision of a floral picture frame of metal, porcelain or other suitable material of any desired size or shape, the front plate of which is provided with a plurality of peculiarly shaped openings for the introduction of the flower stems.

Still another object of my invention is the provision of a floral picture frame for short stemmed flowers in which moisture is supplied to the stems by means of porous water absorbing plates between which the stems are located and supplied with water from a water container combined with a picture frame.

A further object of my invention is the provision of a floral picture frame for flowers having comparatively long stems reaching into the water container and guided through the meshes of a screen cover for the same.

Still further objects of my invention are the provision of a floral picture frame equipped with means for movably holding the rear plates of the frame in place, for securing the picture in its border frame and particularly of a frame of this type of simple and therefore inexpensive construction, yet durable and highly efficient in its operation.

These and other objects and advantages of my invention will become more fully known as the description thereof proceeds and will then be specifically defined in the appended claims.

In the accompanying drawings forming a material part of this disclosure:

Fig. 1 is a front elevation of a floral frame constructed according to my invention.

Fig. 2 is a longitudinal section through the frame on line 2—2 of Figure 1.

Fig. 3 is a cross-section on line 3—3 of Figure 1.

Figure 4:
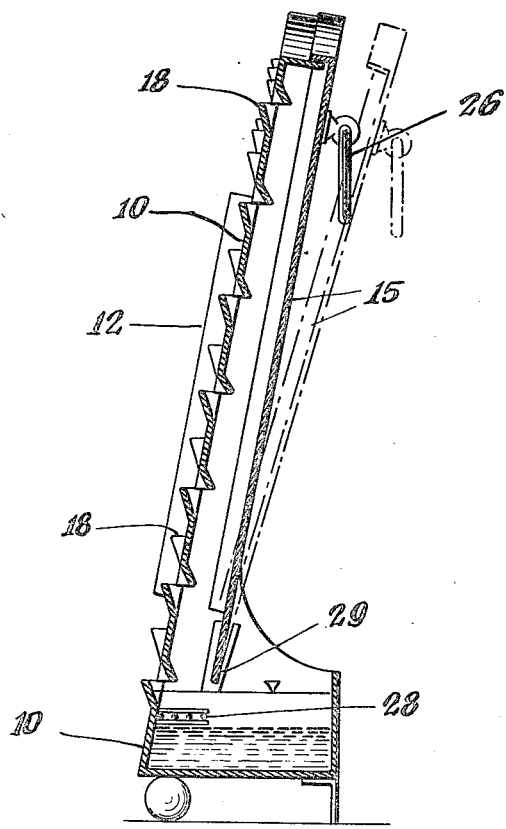
Fig. 4 is a longitudinal sectional view of a modified form of my floral frame.

As illustrated, the floral frame according to my invention comprises a front plate 10, and side plates 11. The front plate 10 carries the customary border frame 12 for the picture frame 13, in approximately the center of the floral frame.

At the foot of the floral frame a container 14 for water is formed in one piece therewith and the rear of the floral frame is covered by the rear cover plate 15.

Front and rear feet 16 and 17 support the frame and the plate 10 is provided with a plurality of openings 18 formed by horizontally slitting the plate as at 19 and bending the material of the frame beneath the slits out of the frame in triangular shape as indicated at 20, while the material above the slits is bent somewhat inwardly, as at 21, to form pockets for the stems of flowers introduced through the pockets.

In the form of my invention illustrated in Figures 2 and 3 a suction plate 22 of porous material is provided in rear of plate 10 and perforated or equipped with openings behind the openings 18 in plate 10, and plate 22 is held in place by means of the pins 23 entering plate 10 from the rear.

Porous plate 22 is covered by another plate 24 also of porous water absorbing material held in place by the rear cover plate 15.

In this manner the stems of the flowers introduced through the pockets will be located between the two porous plates or bipartite means 22 and 24, to receive moisture from the plates gradually sucked up by said plates from the water container 14 into which the lower ends of the plates extend, to hold the cut flowers fresh for a considerable time. The rear plate 15 is guided at its lower end in a guard 25, and a ring 26 at its upper end allows a suspension of the frame from a support. In operation, the rear plate is lifted out of its guard 25, the stems of the flowers are introduced between the two porous plates and the rear cover plate is lowered again and then secured in position by the engagement of the spurs 27 at its upper end with the frame 10.

Figure 5:
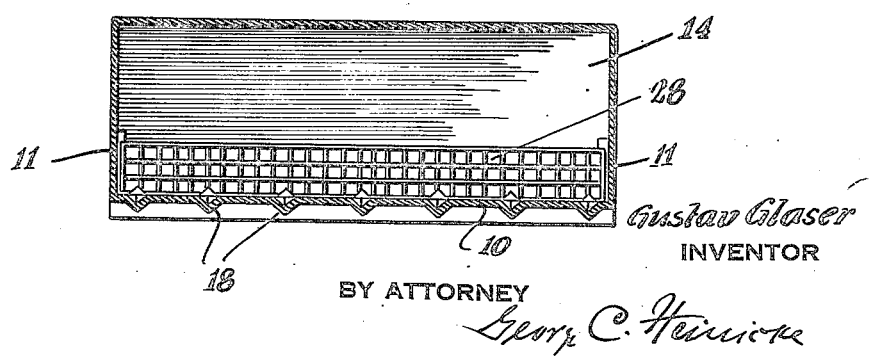
Fig. 5 is a cross-section through this modified form.

In the form of my invention illustrated in Figures 4 and 5 which is intended for long stemmed flowers, reaching with their stems into the water container 14, use of the two porous plates is dispensed with, and the lower ends of the stems are guided through the meshes of a screen 28 covering the water container. The rear cover 15 is guided at its lower edge in guides 29.

The frame 13 for the reception of the picture is loosely located in the border frame 12 on frame 10, and is held therein at its lower end by springs 30 and at its upper end by means of a pin 31.

In operation, the rear plate 15 is bent somewhat rearwardly as indicated in broken lines in Figure 4, and the stems of the flowers are introduced through the pockets and the meshes of the screen into the water container 14 whereafter the rear plate is returned into its original position.

It will be understood that I have described and shown the preferred forms of my device only as examples of the many possible ways to practically construct the same, and that I may make such changes therein as come within the scope of the appended claims without departure from the spirit of my invention.

Having thus described my invention, what I claim as new and desire to secure by Letters Patent is:

1. A floral frame comprising a front plate, a border for holding a picture to said frame, said plate having a plurality of openings formed therein by horizontally slitting the material of the frame, triangularly shaped guides below said slit allowing the introduction of the stems of flowers for decorating the picture held in said border, a water container, and porous bi-partite means receiving the stems between its parts for providing said stems with moisture from said container.

2. A floral frame comprising a front plate having a plurality of openings formed therein for allowing the introduction of the stems of flowers to the rear of said plate, a pair of porous water absorbing plates in rear of said front plate one perforated and allowing the passage of the flower stems, a water container at the foot of said frame into which said absorbing plates extend for absorbing the water from said container and leading it to the flower stems to keep them fresh.

3. A floral frame comprising a front plate having a depression formed therein, a border frame adapted to be placed into the said depression for holding a picture therein, said front plate having a plurality of pockets open to the rear formed therein allowing a guiding of the stems of flowers placed into said pockets to the rear of said plate, a pair of moisture absorbing plates behind said front plate, one perforated to allow the passage of the stems between said moisture absorbing plates, a water container into which the lower ends of said plates extend, a rear cover plate for holding the absorbing plates in place, means for guiding said rear plate, and means on said rear plate for allowing a suspension of the frame.

Signed at Cologne, in the Province of the Rhine, Germany, this 4 day of Nov., A. D. 1930.

GUSTAV GLASER.